United States Patent [19]

Sagara et al.

[11] 3,818,495

[45] June 18, 1974

[54] EXPOSURE VALUE INDICATING MEANS FOR PHOTOGRAPHIC CAMERA

[75] Inventors: Iwao Sagara; Hirohisa Shishikura, both of Tokyo; Saburo Numata, Urawa, all of Japan

[73] Assignees: Fuji Shashin Koki Kabushiki Kaisha, Ohmiya-shi, Saitama-ken; Oki Electric Industry Co., Ltd., Tokyo, both of, Japan

[22] Filed: Feb. 21, 1973

[21] Appl. No.: 334,465

[52] U.S. Cl. ........ 354/53, 354/60, 354/219, 356/227
[51] Int. Cl. ...................... G01j 1/44, G03b 17/18
[58] Field of Search ................. 95/10 C, 10 CE, 42; 356/227

[56] References Cited
UNITED STATES PATENTS

| | | | |
|---|---|---|---|
| 3,452,347 | 6/1969 | Stimson | 95/10 CE |
| 3,452,656 | 7/1969 | Ruhle et al. | 95/10 CE |
| 3,584,962 | 6/1971 | Irwin | 356/227 |
| 3,603,799 | 9/1971 | Nobusawa | 356/227 X |
| 3,727,527 | 4/1973 | Borowski | 95/10 R |

OTHER PUBLICATIONS

Frederick F. Morehead, Sr., "Light-Emitting Semiconductors," Scientific American, May 1967, p. 109.

Primary Examiner—Joseph F. Peters, Jr.
Attorney, Agent, or Firm—Curtis, Morris & Safford

[57] ABSTRACT

A set of light emitting diodes are arranged in a line in the visual field of a viewfinder of a camera and one of the diodes is selectively energized to indicate an exposure value in terms of shutter speed required or the like. An exposure value measuring means including an exposure meter is connected with an input terminal of an exposure value indicating circuit which comprises a set of light emitting diodes connected with a set of switching circuits for selectively energizing one of the light emitting diodes.

16 Claims, 6 Drawing Figures

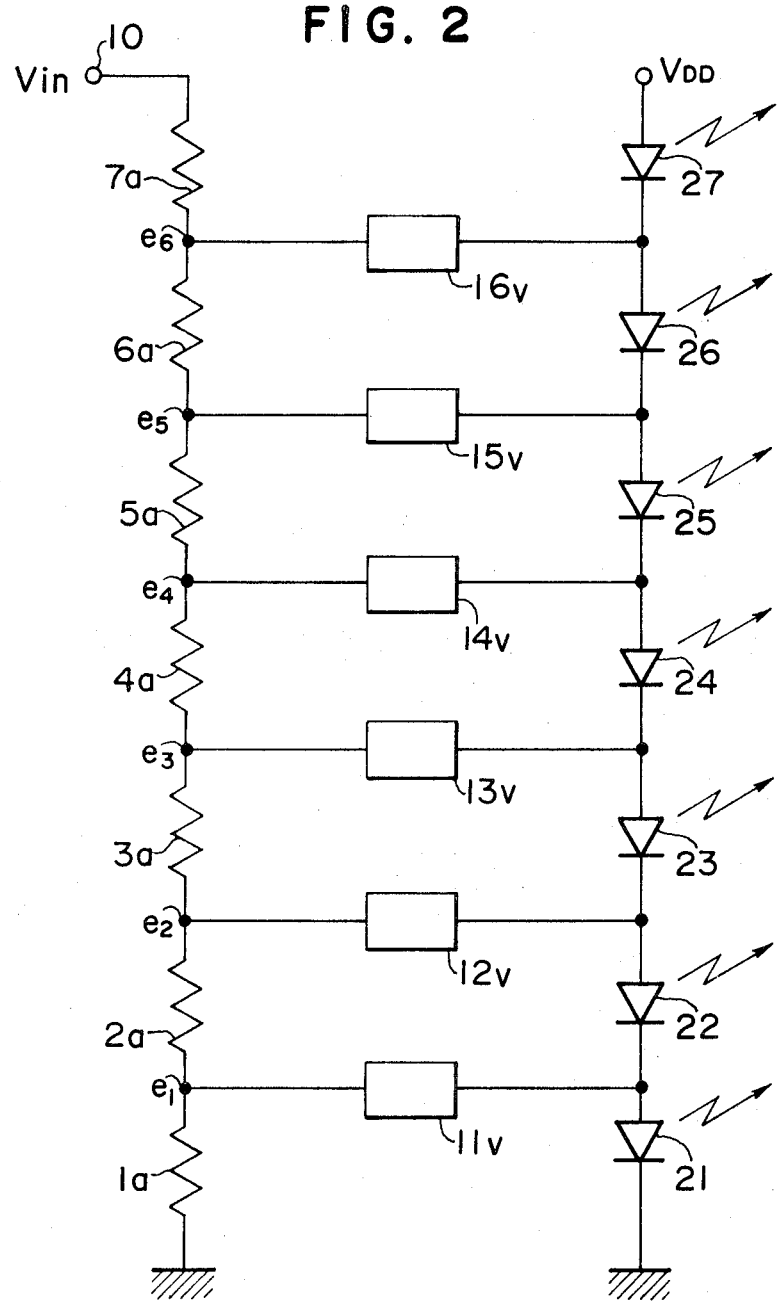

EXPOSURE VALUE INDICATING MEANS FOR PHOTOGRAPHIC CAMERA

BACKGROUND OF THE INVENTION

1. Field of the Invention

This invention relates to an indication means for indicating a correct exposure value in a viewfinder of a photographic camera, and more particularly to an exposure value indicating means which indicates a correct diaphragm value or a correct shutter speed in a camera including an automatic exposure control means.

2. Description of the Prior Art

It has been known in the art to provide an exposure value indicating means in a viewfinder of a camera. One of the conventional exposure value indicating means is of electric type wherein an exposure meter is disposed to show the position of a pointer thereof in the visual field of the viewfinder, and the other type of the conventional means is a mechanical indicating device which has a movable indicator appearing in the viewfinder mechanically associated with a shutter speed adjusting ring or a diaphragm adjusting ring.

The conventional indication means as mentioned above, however, have been disadvantageous in practical use. In case of the electric type means employing an exposure meter, the exposure meter is required to have a large driving torque. Further, due to high sensitiveness of the meter to a shock, the camera involving an electric type exposure value indicating means is required to be handled carefully not to break the meter. In case of the mechanical type exposure value indicating means, a complicated interlocking mechanism is necessitated between the shutter speed or diaphragm controlling ring and the movable indicating member appearing in the viewfinder.

As seen from the above, in the both types of the conventional indication devices, a large space is required in the camera body to be occupied by the indicating means. This has been a great hindrance to the reduction of size of the camera body.

Still further, there has been a great demand for an exposure value indicating means especially in an automatic exposure control camera in order that the photographer may know the resulting exposure time or shutter speed. It is often desired that the actual shutter speed should be known to the photographer so that, for example, he may intentionally take a photograph with a special blur effect.

SUMMARY OF THE INVENTION

In light of the various demands and defects inherent in the conventional devices as mentioned above, the principal object of the present invention is to provide an exposure value indicating means for a camera which has a simple construction and accordingly occupies little space.

Another object of the present invention is to provide a shock resistive electric type exposure value indicating means for a camera.

Still another object of the present invention is to provide an exposure value indicating means adapted to be equipped in an automatic exposure control camera wherein a controlled shutter speed is indicated in the viewfinder.

A further object of the present invention is to provide an exposure value indicating means wherein the exposure value represented by a correct shutter speed or a correct size of diaphragm is indicated clearly and brightly in the viewfinder of a camera.

A still further object of the present invention is to provide an exposure value indicating means which is operable to indicate that photographing is impossible because of over-exposure or under-exposure as well as to indicate the correct exposure value in terms of shutter speed or diaphragm size.

A still further object of the present invention is to provide an electric type exposure value indicating means which can be made extremely compact in size utilizing a technique of integrated circuit (IC), thereby facilitating the design of cameras.

In order to accomplish the above enumerated objects and other objects which will be apparent from the detailed description of the preferred embodiments thereof hereinafter described, the exposure value indicating means in accordance with the present invention utilizes a plurality of light emitting diodes arranged at different positions in a line in the visual field of the viewfinder and selectively energized to indicate the exposure value by the position thereof.

The plurality of light emitting diodes are electrically connected with an exposure value detecting means which in turn is connected with a photoreceptor or a photoelectric conversion element measuring brightness of an object to be photographed.

BRIEF DESCRIPTION OF THE DRAWING

FIG. 2 is a diagram of an electric circuit employing voltage discriminators in an embodiment of the exposure value indicating device in accordance with the present invention;

DESCRIPTION OF THE PREFERRED EMBODIMENTS

Figure 1:
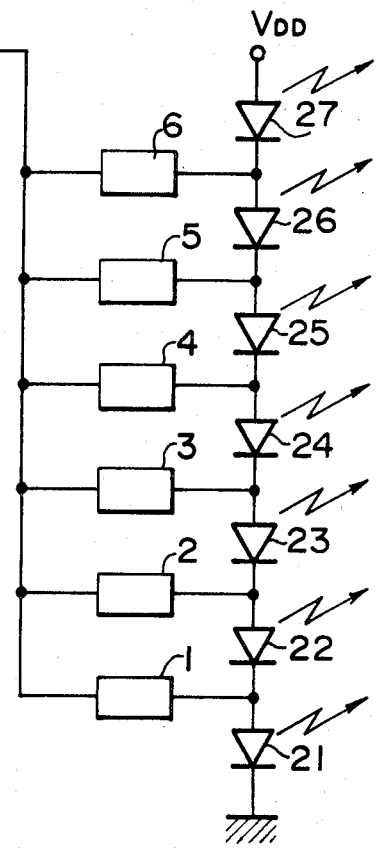
FIG. 1 is a diagram showing a basic electric circuit embodying this invention.

Now referring to FIG. 1 showing a basic electric circuit constituting a main portion of the exposure value indicating device in accordance with this invention, switching circuits 1 to 6 are connected in parallel with an input voltage $V_{in}$ which represents an exposure value. The exposure value representing voltage $V_{in}$ comes from a photoelectric exposure meter incorporating a manual or automatic exposure factor input means such as a shutter speed control means, a diaphragm control means, a film speed indicating means or the like. The voltage $V_{in}$ representing exposure value is, therefore, a function of brightness of an object to be photographed and some other exposure controlling factors such as film speed, preset shutter speed and the like. As illustrated in FIG. 1, between output ends of said switching circuits 1 to 6 are respectively connected light emitting diodes 22 to 26. The output end of the first switching circuit 1 is earthed by way of a light emitting diode 21, and the output end of the last or sixth switching circuit 6 is connected with a power source $V_{DD}$ by way of a light emitting diode 27. Accordingly, light emitting diodes 21 to 27 are connected in series between the power source $V_{DD}$ and the earth.

The switching circuits 1 to 6 have a function to energize selectively one of said light emitting diodes 21 to 27 according to the level of said exposure value representing input voltage $V_{in}$.

For example, each of the switching circuits 1 to 6 comprises a voltage or current discriminator and a driver such as an inverter, or a buffer. The voltage discriminator or the current discriminator operates to energize (or deenergize) the driver in response to supply of voltage or current over a predetermined threshold level thereof. The switching circuits are so constructed that the level of the input voltage or current supplied to the discriminators is always between threshold levels of adjacent discriminators or equal to the threshold level of one of the discriminators. In other words, when the input voltage $V_{in}$ rises or falls the discriminator which is energized (or deenergized) due to variation in the voltage or current input across the threshold level thereof shifts from one end to the other. For example, when the input voltage $V_{in}$ rises, the discriminator energized shifts from the lowermost one 1 to the uppermost one 6. Therefore, when the two of the lower discriminators in the switch circuits 1 and 2 are energized for example, the other four of the upper discriminators 3 to 6 are not energized, and the drivers in the lower circuits 1 and 2 are energized and the drivers in the upper circuits 3 to 6 are not energized. Accordingly, current flows from the circuit 2 to circuit 3 through a light emitting diode 23. If the level of the respective inputs supplied to the discriminators are made equal to each other, the threshold level of the respective discriminators should be made different from each other. If the threshold level of all the discriminators is the same, the voltage or current input of the respective discriminators is made different from each other so as to perform the above operation.

In operation, according to the level of the input voltage $V_{in}$ one of the light emitting diodes 21 to 27 is selectively energized to emit light. Therefore, the exposure value is indicated by the light emitting diodes in terms of the position thereof.

Referring to FIG. 2 showing an embodiment of the light emitting exposure value indicating circuit in accordance with the present invention, a series of resistors 1a to 7a are connected in series with an input terminal 10 to which an exposure value representing voltage $V_{in}$ is supplied. Seven light-emitting diodes 21 to 27 are connected in series with a power source $V_{DD}$. Between the connecting points of adjacent resistors 1a to 7a and the connecting points of adjacent light-emitting diodes 21 to 27, switching circuits 11r to 16r are connected in parallel, respectively. In this illustrated embodiment the number of light-emitting diodes is equal to the number of resistors.

The switching circuits 11v to 16v used in this embodiment are of the type employing a voltage discriminator such as a Schmitt trigger circuit combined with an inverter or a buffer. As the buffer, various known types of buffer can be used such as a combination of a pair of NAND circuits. The voltage discriminator operates as a switch to be turned ON (or OFF) when supplied with a voltage of over the threshold level thereof. The driver (inverter or buffer) operates to make the output voltage thereof lower or higher when it is energized by the discriminator.

In operation of the above described embodiment of the exposure value indicating circuit as shown in FIG. 2, when a small electric voltage $V_{in}$ is supplied to the input terminal 10 because of a low brightness of the object measured by the exposure measuring means so that the divided voltage $e_6$ impressed on the first switching circuit 16v is lower than the threshold level thereof, all the switching circuits 11v to 16v are turned OFF, and accordingly, only the first light emitting diode 27 is energized by the potential difference between the switching circuit 11v (lower-level) (A buffer is used) and the voltage source $V_{DD}$ to which the first light emitting diode 27 is connected.

When the input voltage $V_{in}$ is a little higher so that the divided voltage $e_6$ becomes higher than the threshold level of the first switching circuit 16v but the divided voltage $e_5$, which is lower than $e_6$, is still lower than the threshold level of the second switching circuit 15v, the first switching circuit 16v is turned ON and the output thereof becomes higher. Therefore, due to the potential difference between the first switching circuit 16v (higher) and the second switching circuit 15v (lower), current flows through the second light emitting diode 26. Since the potentials on the opposite sides of the first light emitting diode 27 are the same, no current flows through the first light emitting diode 27. Thus, only the second light emitting diode 26 is energized to emit light. In the similar manner, the third to the sixth switching circuits 14v to 11r are operated to selectively energize the third to sixth light emitting diodes 25 to 22 to indicate the exposure value. When the divided voltage $e_1$ becomes higher than the threshold level of the last switching circuit 11r, the output of the last switching circuit 11r becomes higher and because of the potential difference between the earth and the higher-level output of the switching circuit 11r, the last or the seventh light emitting diode 21 is energized to emit light.

As described above, in accordance with the embodiment shown in FIG. 2, only one light emitting diode is selectively energized and turned on to emit light to show the exposure value. As mentioned hereinbefore, the exposure value is able to be represented in terms of various factors such as shutter speed, diaphragm size etc.

Figure 3:
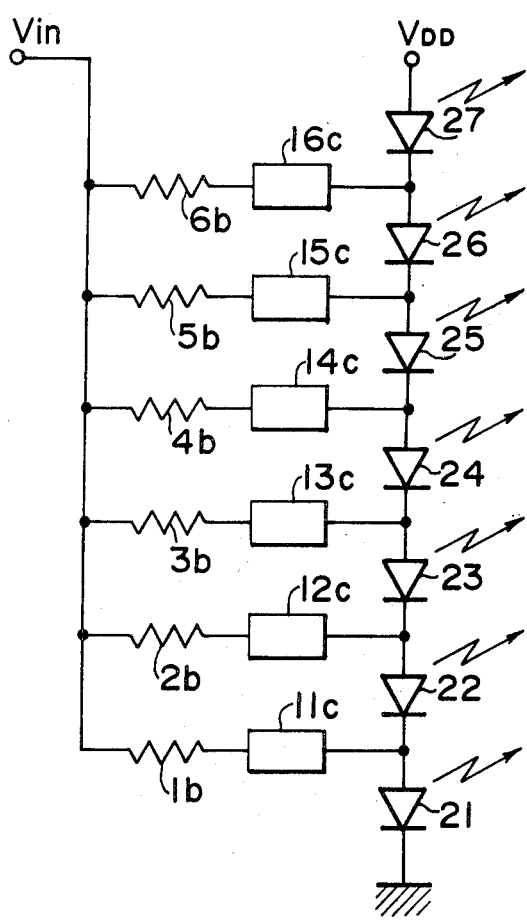
FIG. 3 is a diagram of an electric circuit employing current discriminators in another embodiment of the exposure value indicating device in accordance with the present invention.

Referring to FIG. 3, the reference numerals 11c to 16c indicate switching circuits including a current discriminator and an inverter or a buffer. The switching circuits 11c to 16c are connected in series with resistors 1b to 6b respectively. In case where the resistance of the resistors 1b to 6b is the same, the threshold level of the current discriminators is made different from each other. If the threshold level of the current discriminators of the switching circuits 11c to 16c is the same, the resistance of the resistors 1b to 6b must be made different.

In this embodiment shown in FIG. 3, the current discriminators used in the switching circuits 11c to 16c have the same threshold level and the resistance of the resistors 1b to 6b is made different so that the uppermost resistor 6b has the highest resistance level and the lowermost resistor 1b has the smallest resistance and the intermediate resistors 1b to 6b have the intermediate resistance arranged in their order of arrangement.

Further, each of the current discriminators is connected at its output with an inverter. When a small input voltage $V_{in}$ representing low brightness is supplied so that the input current of the lowermost switching circuit 11c is lower than the threshold level thereof, all the current discriminators are deenergized and accordingly the output of the switching circuits 11c to 16c through the inverters is in higher level. Therefore, in this case, only the lowermost light emitting diode 21 is energized due to potential difference between the higherlevel output of the lowermost switching circuit 11c and the earth.

When the input voltage $V_{in}$ rises up to such a level that the input current of the lowermost current discriminator becomes higher than the threshold level thereof but lower than that of the next current discriminator, the output thereof becomes lower and accordingly only the second light emitting diode 22 is energized to emit light because of potential difference between outputs of the first and second switching circuits 11c and 12c.

Similarly, as the input voltage $V_{in}$ rises up, the light emitting diode selectively energized shifts from the lower to the upper one. When the input voltage $V_{in}$ becomes so high that the input of the uppermost current discriminator in the circuit 16c exceeds the threshold level thereof, only the uppermost light emitting diode 27 is energized.

Thus, the exposure value can be indicated by the position of the light emitting diode energized.

Figure 4:
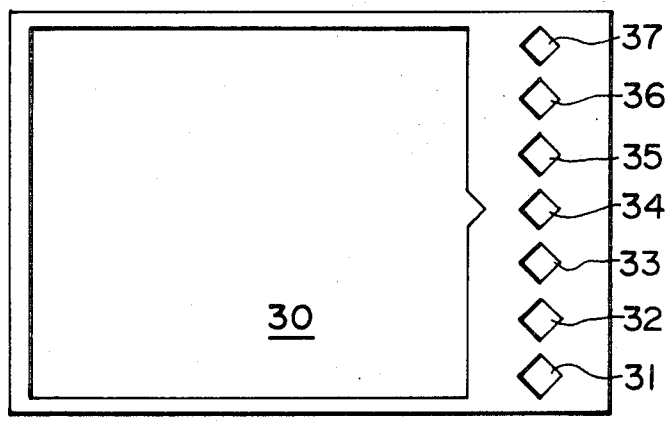
FIG. 4 is a front view showing an embodiment of the indicating portion of the exposure value indicating means of this invention.
Figure 5:
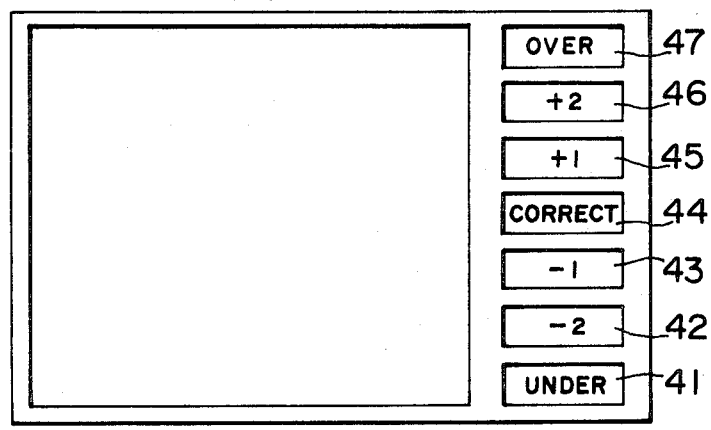
FIG. 5 is a front view showing another embodiment of the indicating portion thereof.
Figure 6:
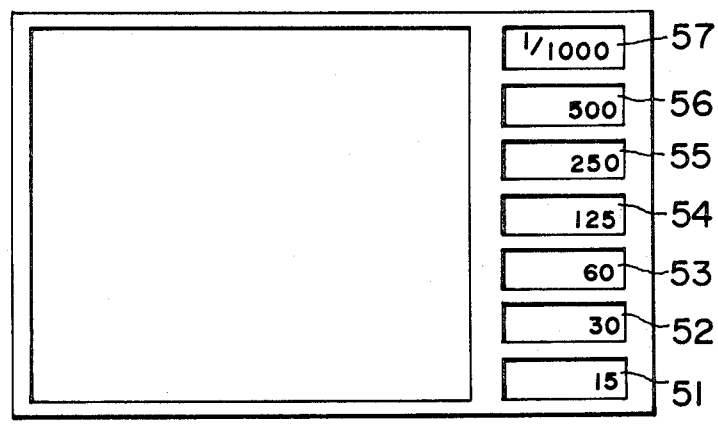
FIG. 6 is a front view showing still another embodiment of the indicating portion thereof wherein the exposure value is indicated in terms of shutter speed.

Some of the examples of the manners to show the exposure value in accordance with the present invention in which the electric circuit as shown in FIG. 1 is employed are shown in FIGS. 4 to 6.

FIG. 4 shows a simple embodiment of the present invention in which the light emitting diodes 31 to 37 corresponding to the light emitting diodes 21 to 27 shown in FIG. 1 are arranged in a line vertically on one side of the visual yield of a viewfinder 30. The lowest light emitting diode 31 indicates when lighted that the brightness of the object is too low to be photographed and accordingly the photograph thereof will become under-exposure. The topmost light emitting diode 37 indicates when lighted that the object is too bright to be photographed and accordingly the photograph thereof will become over-exposure. The intermediate light emitting diodes 32 to 36 indicate the intermediate degree of exposure value and the central light emitting diode 34 indicates that the exposure is correct when it is lighted.

Since, as mentioned hereinbefore, the exposure value input voltage $V_{in}$ is a function of a factor which is manually settable as well as of the brightness of the object, the position of the energized light emitting diode appearing in the viewfinder can be changed by manually operating the manual exposure control means such as a shutter speed adjusting or selecting ring, a diaphragm setting ring and the like.

FIG. 5 shows another embodiment of the exposure value indicating means appearing in the viewfinder in which the light emitting diodes 31 to 37 shown in FIG. 2 are equipped with exposure value indicators having characters thereon which indicate the condition of exposure in more detail. The exposure value indicators 41 to 47 may be half-transparent plastic or glass plates bearing thereon some characters indicating the condition of exposure, such as "UNDER" indicating underexposure, "OVER" indicating over-exposure "−1" indicating that the exposure is one-step under the correct exposure, and so forth. When the indicating means indicates that the exposure is one-step under the correct exposure, the correct exposure can be obtained by enlarging the diaphragm size by one step e.g. from F 8 to F 5.6. As the diaphragm is enlarged by one step, the one-step under indicator 43 is turned off and the correct indicator 44 is turned on in the viewfinder.

Another embodiment of the exposure value indicating means is shown in FIG. 6 in which the condition of the exposure is indicated in terms of shutter speed. In this embodiment, the shutter speed required for taking a correct exposure photograph is indicated in the viewfinder so that the photographer may know the actual shutter speed operated. If the photographer wishes to change the shutter speed, the photographer can change the speed by turning a diaphragm setting ring. As the photographer turns the diaphragm, the energized and lighted indicator switches from the lowest 51 to the highest 57. Thus, the photographer can select a desired shutter speed.

What is claimed is:

1. A device for indicating an exposure value in the visual field of a viewfinder of a camera comprising an input terminal to which an input voltage representing an exposure value is supplied, a plurality of switching circuits connected in common to said input terminal to be selectively operated according to the level of the input voltage, and a plurality of light-emitting diodes connected in series and disposed in the visual field of a viewfinder of a camera, each of said light-emitting diodes being respectively interconnected between output terminals of adjacent switching circuits so as to be selectively energized by said switching circuits whereby one of said light-emitting diodes is selectively energized to emit light according to the level of said input voltage.

2. An exposure value indicating means as defined in claim 1 wherein each of said switching circuits comprises a voltage discriminator and a driver.

3. An exposure value indicating means as defined in claim 2 wherein said driver is an inverter.

4. An exposure value indicating means as defined in claim 2 wherein said driver is a buffer.

5. An exposure value indicating means as defined in claim 1 wherein each of said switching circuits comprises a current discriminator and a driver.

6. An exposure value indicating means as defined in claim 5 wherein said driver is an inverter.

7. An exposure value indicating means as defined in claim 5 wherein said driver is a buffer.

8. An exposure value indicating means as defined in claim 1 wherein each of said switching circuits comprises a discriminator having a predetermined threshold level and a driver.

9. An exposure value indicating means as defined in claim 8 wherein said driver is energized by said discriminator when input voltage or current supplied to the discriminator is over said threshold level.

10. An exposure value indicating means as defined in claim 8 wherein the threshold level of each discriminator in said switching circuit is made equal to each other and the input voltage or current supplied to the respective discriminators is made different from each other.

11. An exposure value indicating means as defined in claim 8 wherein the threshold levels of the discriminators in said switching circuits are made different from each other and the input voltages or current supplied to the respective discriminators are made equal to each other.

12. An exposure value indicating means as defined in claim 1 wherein said light emitting diodes are provided with an exposure value indicator means having characters representing a factor of an exposure value.

13. An exposure value indicating means as defined in claim 12 wherein said exposure value indicator means indicates a shutter speed.

14. An exposure value indicating means as defined in claim 12 wherein said exposure value indicator means indicates a diaphragm size.

15. An exposure value indicating means as defined in claim 1 wherein said light emitting diodes are arranged in a line in which a diode at one end of the line represents over-exposure condition and a diode at the other end of the line represents under-exposure condition.

16. A device for indicating an exposure value in the visual field of a viewfinder of a camera comprising a series of resistor means connected in series with an input terminal adapted to receive a voltage representing an exposure value, an exposure value measuring means including a photo-receptor for receiving light from the object to be photographed by said camera, a manual exposure control means for selecting a factor of exposure control, said exposure value measuring means and said manual exposure control means being connected with said input terminal for supplying an input voltage representing an exposure value to be effected on the film in the camera, a series of light-emitting diodes of the same number as that of said resistors connected in series with a power source, and a plurality of switching circuits connected between connecting points of adjacent resistors and connecting points of adjacent light-emitting diodes, respectively, said switching circuits having different threshold levels and being arranged in the order of the threshold level so as to be selectively operated according to the level of said input voltage, whereby one of said light-emitting diodes is selectively energized according to said input voltage.

* * * * *

UNITED STATES PATENT OFFICE
CERTIFICATE OF CORRECTION

Patent No. 3,818,495  Dated June 18, 1974

Inventor(s) Iwao Sagara, et al.

It is certified that error appears in the above-identified patent and that said Letters Patent are hereby corrected as shown below:

The following is hereby inserted in the heading of the above-identified patent:

Foreign Application Priority Data

February 28, 1972   Japan ............ 20334/1972

Page 2

UNITED STATES PATENT OFFICE
CERTIFICATE OF CORRECTION

Patent No. 3,818,495        Dated June 18, 1974

Inventor(s)  Iwao Sagara, et al.

It is certified that error appears in the above-identified patent and that said Letters Patent are hereby corrected as shown below:

In Claim 16:

lines 7-8, "a manual---factor" is cancelled.

lines 8-9, "of exposure control," is cancelled.

line 9, "and" is cancelled.

line 10, "said manual exposure control means" is cancelled.

line 19, "different" is changed to --predetermined--.

line 20, "the" (second occurrence) is changed to --their--.

line 20, "so as to be" is changed to --responses to--.

lines 20-21, "selectively operated according to" is changed to --changes in--.

Signed and sealed this 3rd day of December 1974.

(SEAL)
Attest:

McCOY M. GIBSON JR.  
Attesting Officer

C. MARSHALL DANN  
Commissioner of Patents